July 22, 1958 L. S. LYNCH, JR 2,844,089
AUTOMATIC BREAD TOASTERS
Filed April 16, 1953 4 Sheets-Sheet 4
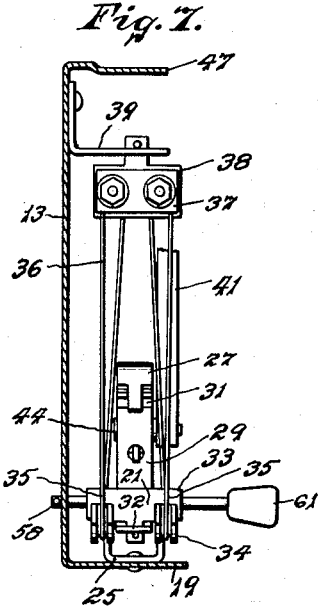
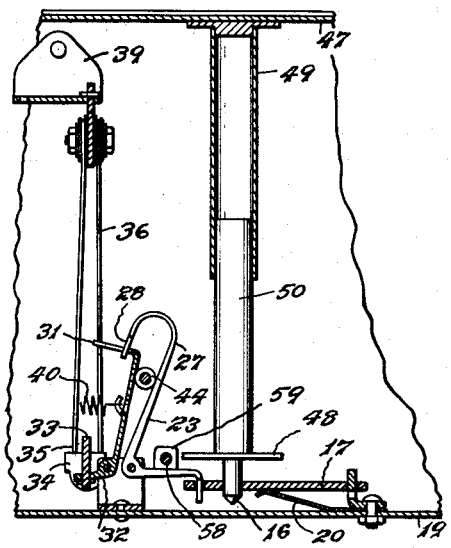
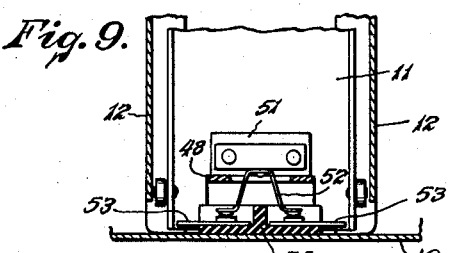
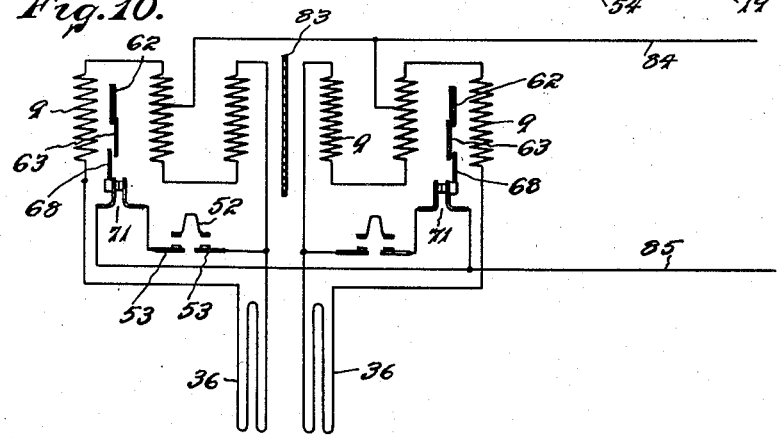
INVENTOR.
LESLIE S. LYNCH Jr.
BY
Louis V. Lucia
ATTORNEY.

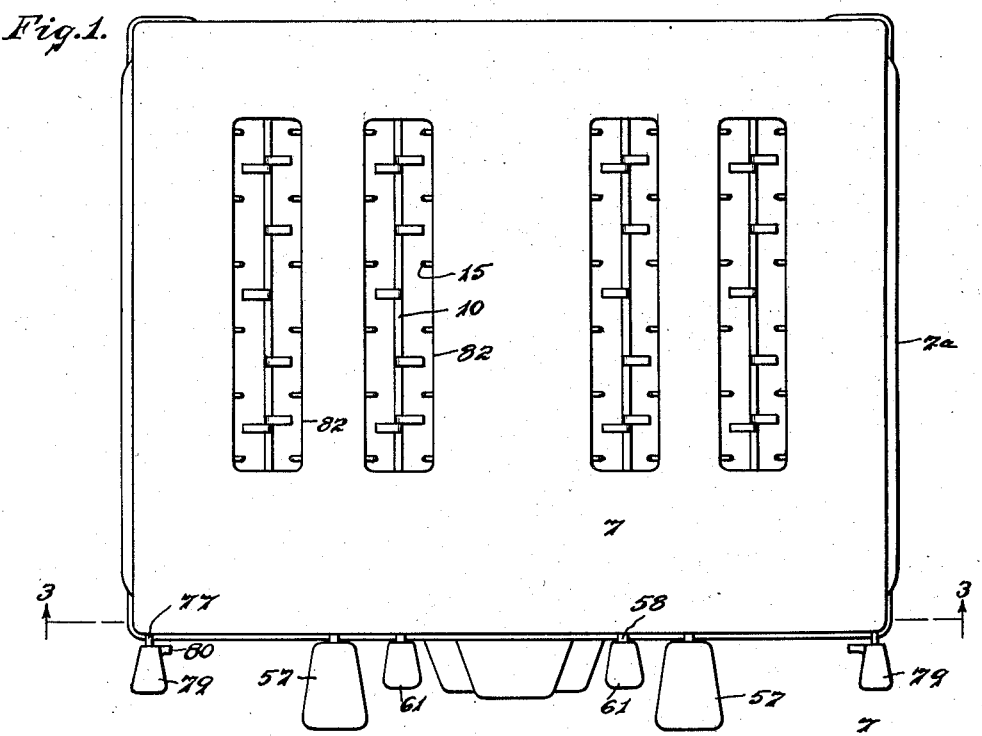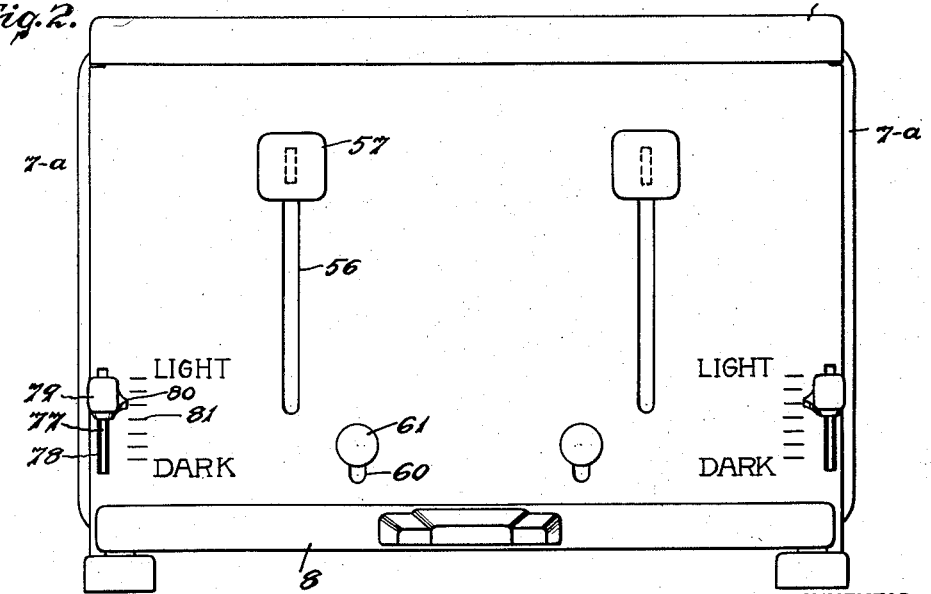

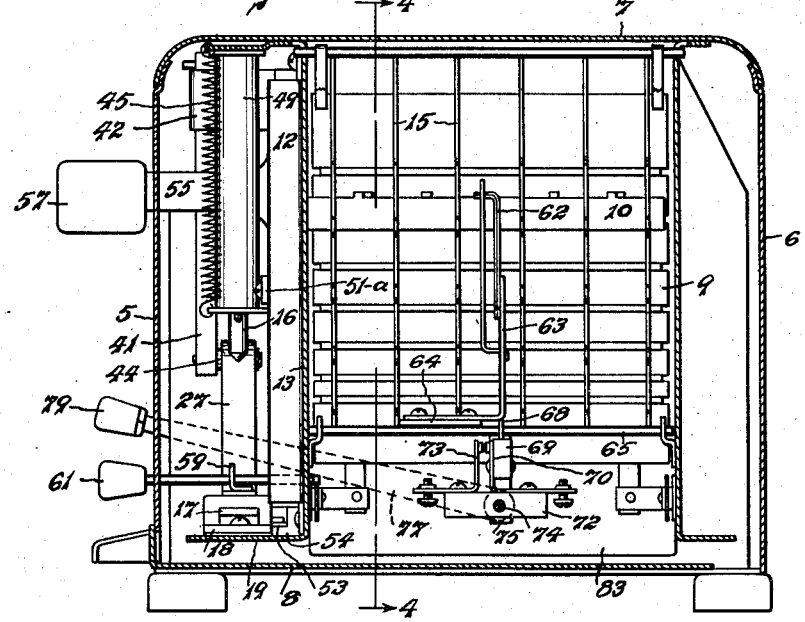
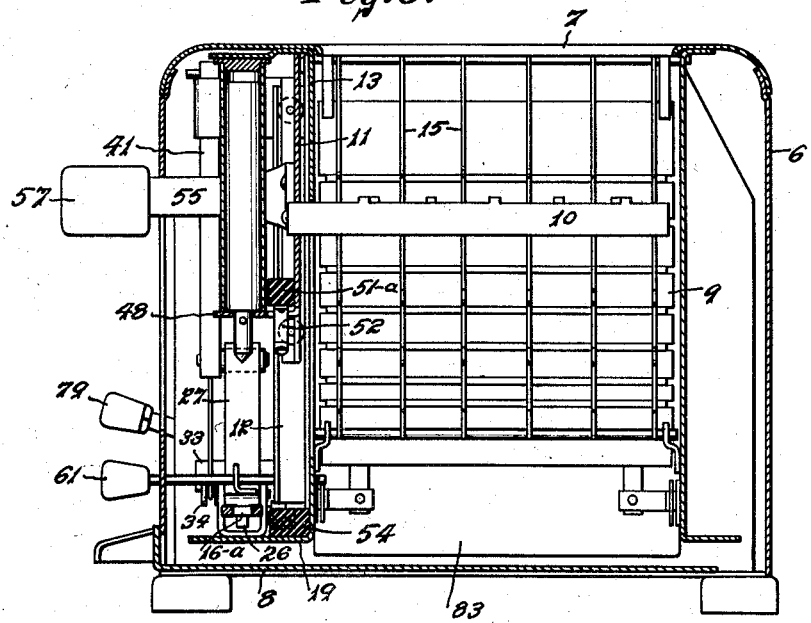
INVENTOR.
LESLIE S. LYNCH JR.
BY
Louis V. Lucia
ATTORNEY.

United States Patent Office 2,844,089
Patented July 22, 1958

2,844,089

AUTOMATIC BREAD TOASTERS

Leslie S. Lynch, Jr., Bogota, N. J., assignor to Rudo Associates, Newark, N. J.

Application April 16, 1953, Serial No. 349,182

6 Claims. (Cl. 99—329)

This invention relates to automatic bread toasters and more particularly to electric toasters of the type having a movable bread carrier, latch means associated with the bread carrier to retain it in toasting position and means for automatically tripping the latch means at the end of a toasting operation.

An object of the present invention is to provide an improved automatic toaster of a novel construction whereby it is rendered particularly adaptable for commercial use, such as when used in restaurants and the like.

A further object of this invention is to provide such a toaster having therein improved means for thermally separating one toasting compartment from another compartment, or a group of such compartments from another group, so as to prevent the heat in one of said compartments or groups from affecting the toasting operation of another compartment or group of compartments and thereby attain more efficient and accurate automatic operation of the toaster.

A still further object of this invention is the provision of improved means for adjusting the toaster for a desired degree of toasting and for releasing the bread carrier to permit its return to normal position upon the completion of a toasting operation.

Further objects and advantages of this invention will be more clearly understood from the following description and the accompanying drawings in which:

Fig. 1 is a plan view of a toaster embodying my invention.

Fig. 2 is a front view of said toaster.

Fig. 5 is a sectional side view on line 5—5 of Fig. 4.

Fig. 6 is a sectional side view on line 6—6 of Fig. 4.

Fig. 7 is a fragmentary side view of the latch releasing mechanism.

Fig. 8 is a fragmentary front view of said latch releasing mechanism.

Fig. 9 is a fragmentary sectional front view of the main electric switch used in said toaster.

Fig. 10 is a diagrammatic view of one form of an electric circuit which may be used in said toaster.

Figure 3:
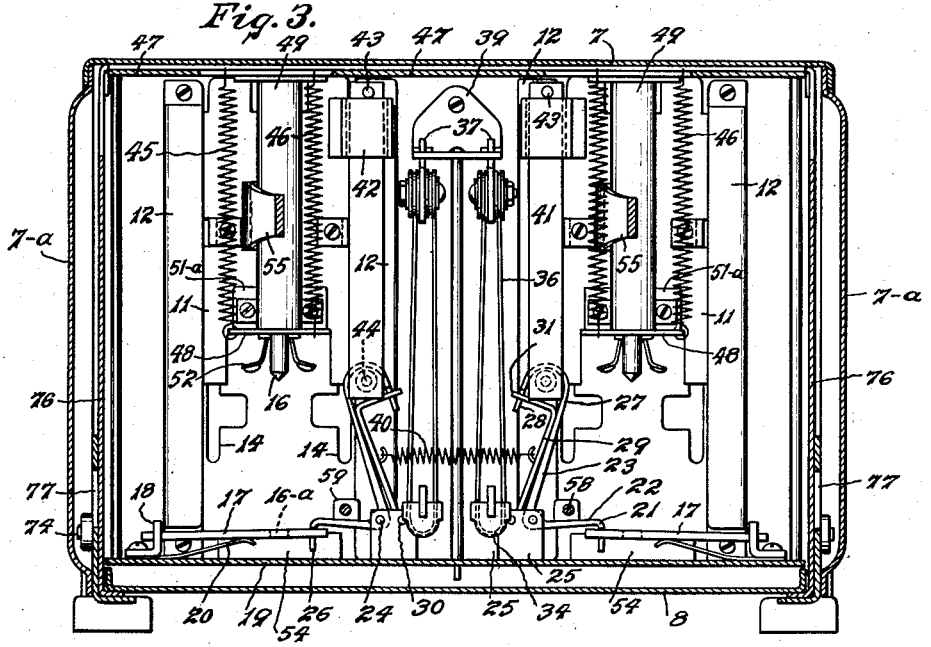
Fig. 3 is a sectional front view on line 3—3 of Fig. 1.
Figure 4:
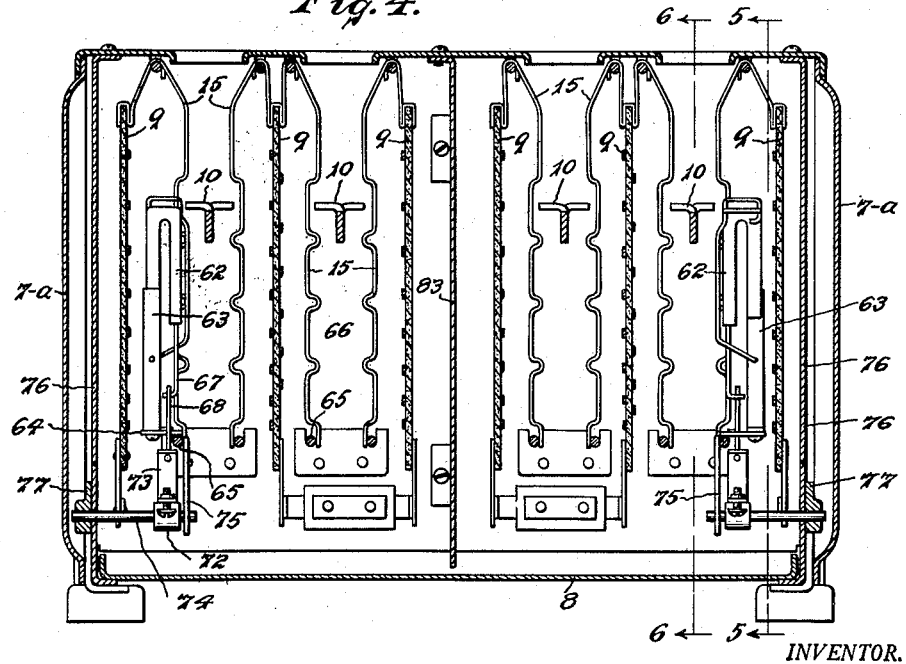
Fig. 4 is a sectional front view on line 4—4 of Fig. 5.

As illustrated in the drawings, my invention is embodied in an automatic electric toaster which includes a casing that is preferably constructed of a front plate 5, a rear plate 6, a top plate 7 and end plates 7-a; the bottom of said casing being substantially closed by means of a suitable removable tray 8 which is adapted to catch crumbs that may drop through the toaster.

Within the said case there is mounted a series of electrical resistances in the form of heating elements 9 between which are provided suitable bread slice carriers 10 for supporting bread slices in toasting position between two adjacent heating elements. In the toaster illustrated, there are two independent toasting units each including a group of two toasting chambers having therein a series of three heating elements 9 and two bread slice carriers 10 which are jointly mounted upon a carrier plate 11 that is vertically slidable between channelled guide bars 12—12 which are mounted on a front supporting plate 13; the said bread slice carriers extending inwardly from the carrier plate, through slots 14—14 in said front plate, and being preferably constructed of suitable bars which are movable between suitable guard wires 15—15 which protect the adjacent heating elements and position the bread slices upon the carriers 10.

The carrier plate 11 carries a detent finger 16 which preferably projects downwardly therefrom and is adapted to enter a hole 16-a in a jam bar 17 that is pivotally mounted in an upright bracket 18 that is secured to a perpendicular portion 19 which extends from the front supporting plate 13. A spring 20 is preferably provided for biasing the jam bar 17 upwardly against shoulders 21 on an extension 22 of an operating lever 23 which is pivotally mounted at 24 in a bracket 25 on the portion 19. The extension 22 has a finger 26 which extends downwardly through a slot in the end of the jam bar to thereby operatively connect the said extension to the jam bar.

The upper end of the lever 23 is bent back so as to form a loop 27 and a finger 28. Below said loop there is pivotally mounted a separate lever 29 which is pivoted at 30 and has a perpendicular forked extension 31 that underlies the loop 27 and straddles the stop finger 28. The said lever 29 has a short extension 32 which carries a hanger 33 that has mounted thereon insulating members 34—34 to which are secured a pair of loops 35—35 of an expandable and contractable resistance wire 36 which is commonly called a "hot wire."

The said "hot wire" 36 is suitably secured at its upper end to an insulating block 37 that is mounted upon a hanger 38 which is suspended from a bracket 39 secured to the front supporting plate 13 and the levers 29 are biased by means of a spring 40 in order to apply a pull on each "hot wire" 36 which will keep it taut.

A gravity operated bar 41 is carried in a bracket 42 that is mounted on and extends from the carrier plate 11 and the said bar is loosely suspended from said bracket, by means of a pin 43, and carries at its lower end an interposable take-up roller 44 which is rotatably mounted upon the bar and extends therefrom into the loop 27.

The carrier plate 11 is biased upwardly into its normal position by means of suitable springs 45 and 46 which are anchored at one end to an overhanging portion 47 of the supporting plate 13 and at their opposite ends to the extension 48 of the carrier plate 11.

In order to cushion the upward movement of the bread slice carriers 10, there is provided an air cylinder 49, which is secured to the overhanging portion 47, and a piston 50 which is secured to the extension 48 and is slidable in said cylinder.

The carrier plate 11 also carries a main switch 51 which includes a block 51-a upon which there is mounted a switch bar 52 that projects through an opening in the extension 48 and is adapted to engage a pair of electrical contacts 53—53 which are mounted in a switch block 54 of insulating material that is secured to the perpendicular portion 19 of the supporting plate..

An operating handle bar 55 is secured to the carrier plate 11, extends upwardly therefrom through a slot 56 in the front plate 5 and carries a manually operable handle 57.

The lever 23 may be rocked, to cause releasing movement of the jam bar 17, by means of a trip bar 58 which is pivotally anchored at one end in the supporting plate 13 and extends therefrom through a bracket 59 on said lever and a slot 60 in the front plate and has an operating handle 61 secured to its outer end.

The operation of my improved toaster is automatically controlled by means of a thermally responsive device which preferably includes an inverted U-shaped thermostatic member 62 that is secured by one leg thereof to an upright supporting bar 63 that is mounted upon a bracket 64 which is secured to the lower supporting bar 65 of the guide wires 15. One of said thermally responsive devices is provided for each toasting unit and it is disposed in the heating chamber 66 of its respective unit which is located adjacent to one end of the toaster.

The thermostatic member 62 has, extending from its free leg, a switch operating finger 67 which engages with a finger 68 that extends upwardly from an insulating block 69 that is carried upon a movable switch blade 70 of a control switch 71 that is mounted upon an insulating block 72 and which also includes a stationary blade 73.

The said block 72 is carried on a rocker shaft 74 which is rotatably mounted at one end thereof in a bearing plate 75, that is also secured to the supporting bar 65 and, at its other end, in an inner end plate 76 which is positioned adjacent to the outer end plate 7–a.

The said rocker shaft 74 has secured thereto an operating bar 77 which extends forwardly of the toaster, between the inner and outer end plates 7–a and 76, and through a slot 78 in the front plate 5. A handle 79 is secured to the end of the said bar and is preferably provided with a pointer 80 which registers with the graduations 81 on the front plate 5 to indicate the setting of the said control switch.

The top plate 7 is conventionally provided with slots 82 through which bread slices are deposited upon the carrier bars 10.

It will be understood from the above description that my improved toaster includes two separate toasting units, each of which provides two toasting chambers that are jointly controlled by means of a single heat responsive device that includes the thermostatic member 62 and the control switch 71.

As shown in Fig. 10, each toasting unit is operable entirely independently of the other unit and has its own thermally responsive device and "hot wire" for controlling its operation.

It has been found that in conventional automatic electric toasters of the multiple unit types, the operation of the thermally responsive device of one unit is effected by the heat generated in an adjacent unit to an extent which renders it practically impossible to obtain accurate thermostatic control of the operation of the different units.

Therefore, in order to prevent the thermally responsive device of one toasting unit of my improved toaster from being effected by the temperature of its other unit, I have located each of the control devices at the far end of its respective unit so that the control device of one unit is removed from the adjacent unit as much as possible to thereby reduce the thermal effect of the temperature of one unit upon the thermally responsive device of the other unit.

In order to further reduce said thermal effect upon the control devices, I provide a separating plate, or partition 83, between the adjacent separate toasting units; the said partition extending fully across the width of the toasting chambers to thereby provide a substantially tight heat barrier between the two toasting units which will minimize the effect of the temperature in one toasting unit upon the thermally responsive device of the other unit and thereby provide for completely independent and accurate control of the operation of each unit.

The operation of my improved toaster is as follows: Assuming that the toaster is connected to a suitable electric circuit, by means of the wires 84 and 85, and that it is desired to toast two bread slices; the said bread slices are deposited upon the carrier bars 10 of the two adjacent toasting chambers in one of the toasting units and the said bars are then lowered by pressing downwardly upon the operating handle 57. This will cause the carrier plate 11 to move downwardly, against the tension of the springs 45 and 46, and carry the switch bar 52 of the main switch 51 into contact with the switch contacts 53—53 in the block 54 and thereby close the main switch. At the same time, the piston 50 will be pulled downwardly by the carrier plate 11 until it is located at the lower end of the cylinder 49.

As the carrier plate reaches its lowermost position, the detent finger 16 will enter the hole 16–a in the jam bar 17 which, under the influence of the spring 20, will cause the said jam bar to hold the detent and thereby retain the carrier plate and the supporting bars 10—10 thereon in their lower position and the main switch in its closed position. The electric courrent flowing through the circuit will then energize the heating elements and the "hot wire" of the toasting unit which is in operation.

The downward movement of the carrier plate 11 will also carry the bracket 42 away from the supporting pin 43 and thereby cause the bar 41 to move downwardly by gravity until the roller 44 thereof rests upon the top of the extension 31 of the lever 29.

As the said "hot wire" becomes heated, it will expand and cause the lever 29 to be rocked on its pivot, under the influence of the spring 40, in a direction away from the lever 22. This will permit the roller 44 to gradually move downwardly between the levers 22 and 29, as shown in Fig. 8, in conformance with the degree of expansion of the "hot wire" 36.

As the toasting operation is being performed and the thermostatic member 62 becomes heated, the free leg of the said thermostatic member will flex and swing the finger 67 against the finger 68 until it has moved the flexible switch bar 70 away from the bar 72 and thereby opened the electric circuit through the heating elements and the hot wire of the toasting unit. The "hot wire" will then immediately begin to cool and, as it cools, it will contract and thus rock the lever 29 in the direction of the lever 23 and, through the roller 44, cause the said lever 23 to also rock. The extension 22 of the said lever 23 will then engage and force the end of the jam bar 17 downwardly, against the tension of the spring 20, and cause the said jam bar to release the detent finger 16 and permit the springs 45 and 46 to raise the carrier plate 11 and return it to its normal position. The switch bar 52 will then be carried away from the contacts 53—53 to cause the opening of the main switch and thereby completing the cycle for the toasting operation.

The return of the carrier plate to its normal position will also raise the bar 41 and thereby remove the roller 44 from between the levers 23 and 22. This will allow the lever 23 to rock and raise the extension 21 thereof and thereby permit the jam bar to be returned to its normal position and held therein by the spring 20 so that it will be operable to engage the detent 16 for another toasting operation while the "hot wire" is cold and contracted.

As the toaster cools after a toasting operation, the free leg of the thermostatic member 62 will return towards its normal position and permit the control switch 71 to close and thereby return the entire electrical circuit of the toasting unit to its normal position wherein the said unit will be in condition for the next toasting operation.

It will be noted that the degree of toasting which is permitted in a toasting unit is determined by the distance between the fingers 67 and 68 and that the said distance may be changed to selectively vary the the degree of toasting by simply adjusting the handle 79 along the graduations 81 towards the indicia "Light" or "Dark" so as to obtain the desired degree of toasting. The movement of the said handle 79 will cause the bar 77 to rotate the rocker bar 73 and thereby vary the position of the control switch to increase or decrease the distance between the fingers 67 and 68 so that, when a higher degree of toasting is required, the free leg of the thermally responsive member 62 will be required to flex a longer distance and the length of the toasting period is thereby increased and, when a lesser degree of toasting is required, the said leg will be required to flex a lesser distance and the length of the toasting period is thereby decreased.

When desired, the toaster may be operated manually to terminate a toasting operation or to raise a bread slice for inspection by pressing downwardly upon the handle 61. This will rock the extension 22 of the lever 23 against the end of the jam bar 17 and cause said jam bar to release the detent finger.

It will be also understood from the above description that my improved toaster is capable of automatically performing toasting operations in a highly efficient and accurately controlled manner for the reason that the operation of one toasting unit thereof is practically unaffected by the heat from an adjament unit due to the maximum distance which is provided between the thermostat of each unit and the heating element of the adjacent unit and to the partition 83 which effectively separate the different toasting units from each other.

I claim:

1. An automatic electric device including a heating element, an electric resistance element expandable upon energization and heating thereof and contractable upon de-energization, an electric circuit for energizing said heating element, a switch for controlling said circuit, mechanism for holding said switch closed including a detent, a jam bar movably mounted to engage and release said detent, a first operating member for moving said jam bar to release the detent, a second operating member operated by the said resistance element upon energization thereof, a spring for moving the second operating member during the expansion of the resistance element, and a separate member variably interposable between said first and second operating members during the movement of the second operating member by the spring for connecting the said first and second operating members and causing the operation of the first operating member upon the contraction of the resistance element and operation of the second operating member thereby.

2. An electric device as set forth in claim 1 including means whereby the interposable member is removed from between the operating members upon the release of the detent by the jam bar.

3. An automatic electric toaster including a heating element, a carrier plate vertically movable between raised and lowered positions, a bread slice carrier mounted upon said carrier plate, an electric circuit for energizing the heating element, an electric switch for controlling said circuit including a contact bar carried by said carrier plate for closing and opening said circuit, a detent associated with said carrier plate, a movably mounted jam bar adapted to engage the detent for holding the carrier plate in lowered position and the switch in closed position, a first operating lever for moving said jam bar to cause it to release the detent and permit the return of the carrier plate to its raised position, a second operating lever, an expandable and contractable electric resistance element for operating the second operating lever, a gravity-operated member interposable between the said first and second levers during the movement of the second operating member by the expansion of the resistance element while the carrier plate is held in lowered position and the switch in closed position by engagement of the detent with the jam bar, the said interposable member being operable to variably connect the first operating lever to the second operating lever during the expansion of the resistance element and to rock the first lever upon the movement of the second lever by the contraction of the resistance element and thereby cause release of the detent by the jam bar, and means connecting said interposable member with the carrier plate for removing the interposable member from between the said levers and releasing the first lever upon the return of the carrier plate to its raised position.

4. An electric automatic toaster as set forth in claim 3 wherein the connecting means include a gravity-operated bar slidably mounted upon the carrier plate.

5. An electric automatic toaster as set forth in claim 3 wherein the connecting means include a gravity-operated bar, the interposable member comprises a roller carried by said bar and extending therefrom between the first and second levers, and the said bar is slidably connected to the carrier plate.

6. An automatic toaster including an electric circuit, a plurality of electric heating elements in said circuit, an expandable and contractable electric resistance element in series with said heating elements, a normally closed control switch and a normally open main switch in series in said circuit, a carrier plate movable between raised and lowered positions, contact means carried by the carrier plate for closing the main switch, a detent on said carrier plate, a movably mounted jam bar for engaging said detent to hold the carrier plate in lowered position and the main switch closed, a first operating lever for moving said jam bar to cause disengagement of the detent, a second operating lever operated by the expansion of the resistance element and adapted to be moved to angular positions relatively to the first operating lever by the expansion of the resistance element, an interposable member movable to different positions between the said first and second operating levers during the expansion of the resistance element for causing operation of the first lever by the second lever upon the contraction of the resistance element, means for returning said carrier plate to its raised position upon the operation of the jam bar by the first lever and the release of the detent, means providing a lost motion connection between the carrier plate and the interposable member for removing said member from between the operating levers upon the return of the carrier plate to its raised position, and spring means for urging the jam plate into its normal position wherein it will engage the detent when the carrier plate is lowered.

References Cited in the file of this patent

UNITED STATES PATENTS

| | | |
|---|---|---|
| 482,024 | Payson | Sept. 6, 1892 |
| 1,923,590 | Schlemm | Aug. 22, 1933 |
| 2,099,210 | Ireland | Nov. 16, 1937 |
| 2,165,204 | Anderson | July 11, 1939 |
| 2,253,637 | McCullough | Aug. 26, 1941 |
| 2,266,024 | Gomersall | Dec. 16, 1941 |
| 2,269,178 | Breneman | Jan. 6, 1942 |
| 2,285,141 | Biebel | June 2, 1942 |
| 2,301,070 | Meyers | Nov. 3, 1942 |
| 2,337,124 | Olving | Dec. 21, 1943 |
| 2,624,269 | Hild | Jan. 6, 1953 |
| 2,634,749 | Cone | Apr. 14, 1953 |